United States Patent Office 3,388,576
Patented June 18, 1968

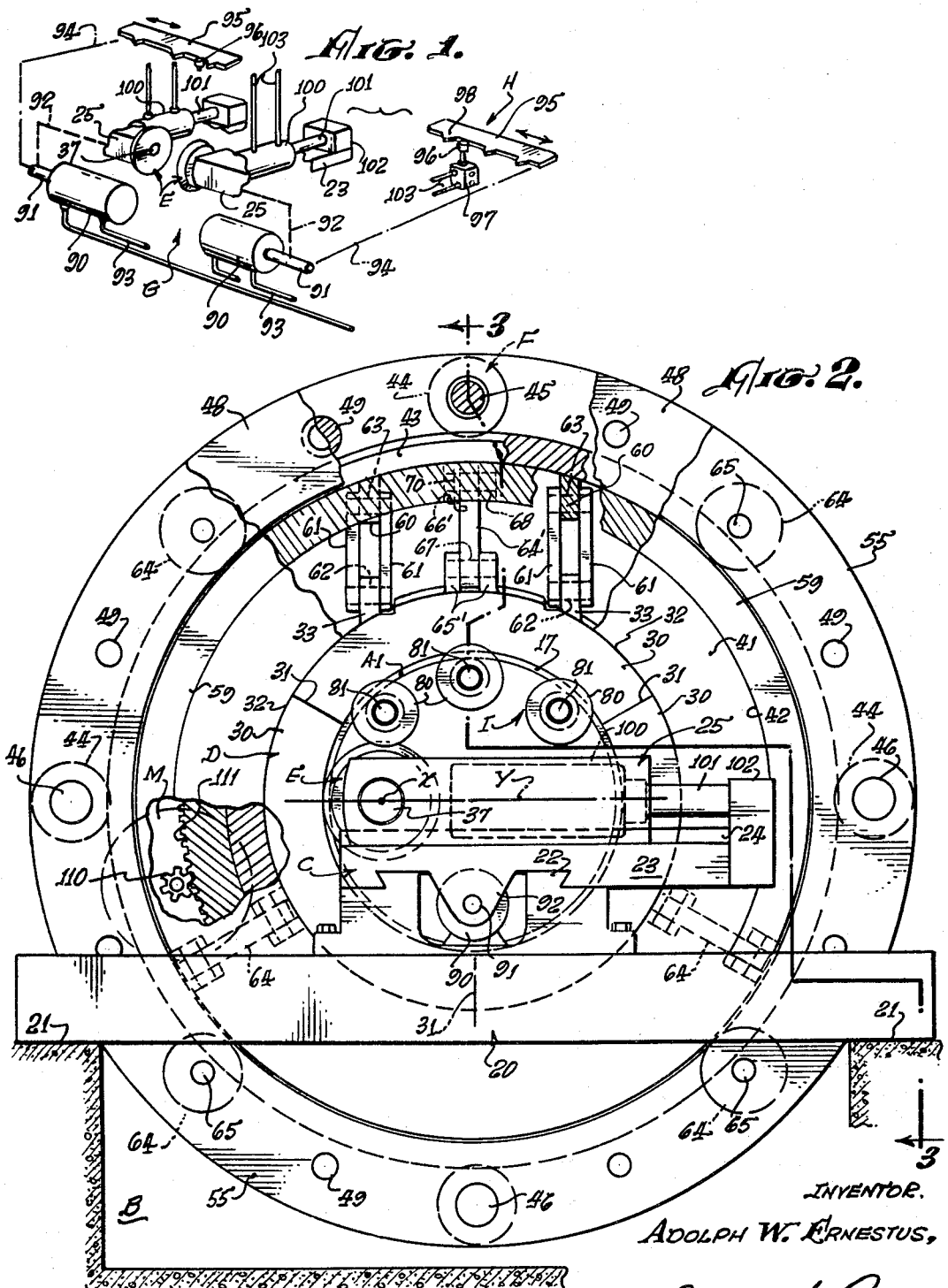

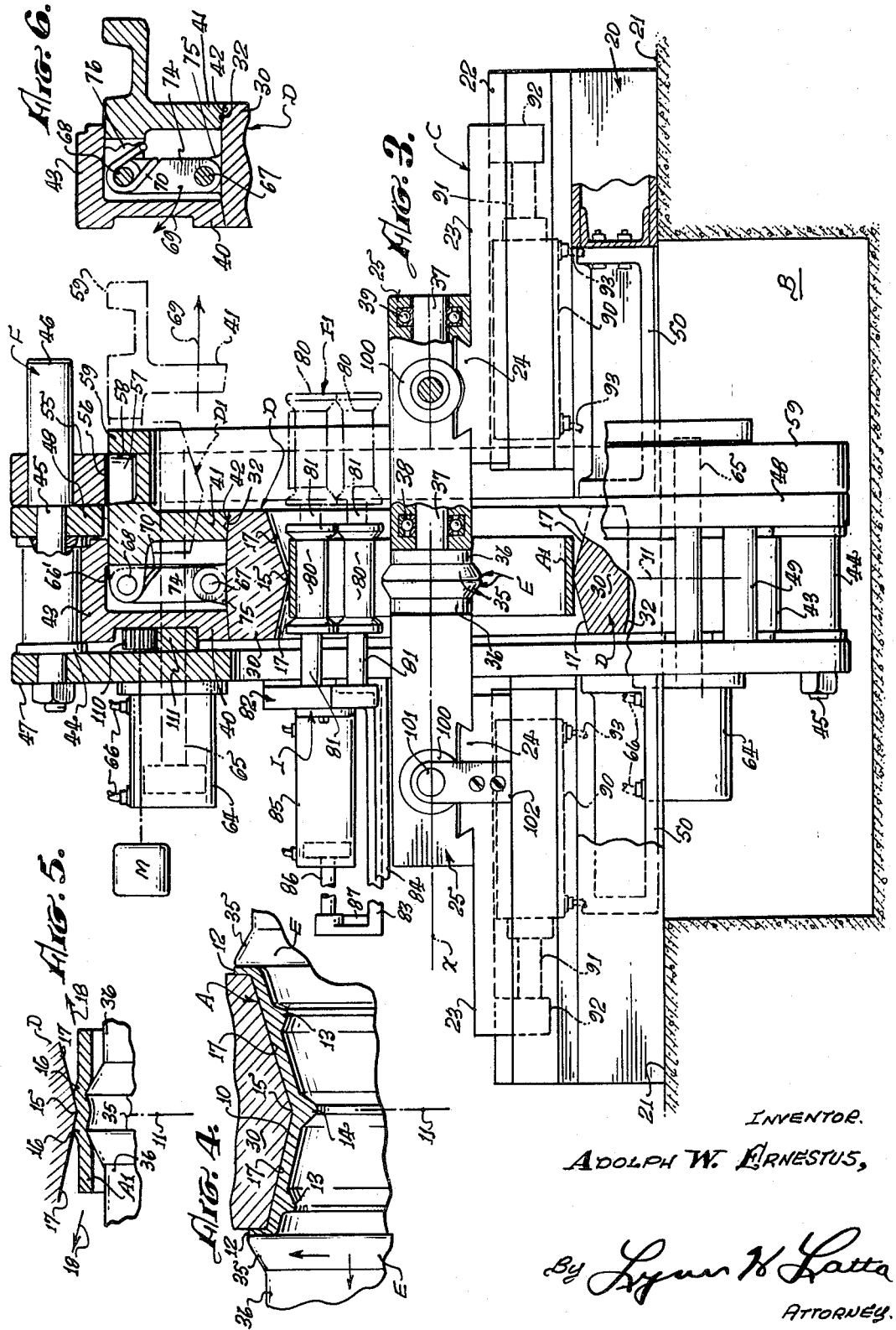

3,388,576
METHOD AND APPARATUS FOR EXTRUSIVE ROLLING OF ANNULAR MEMBERS
Adolph W. Ernestus, Los Angeles, Calif., assignor to N.T.W. Missile Engineering, Inc., Los Angeles, Calif., a corporation of California
Filed Oct. 21, 1965, Ser. No. 500,108
10 Claims. (Cl. 72—81)

This invention relates to extrusive rolling of annular parts such as cylinders, cones, collars, and rings and intermediate shapes and has as its general object to provide an improved method of extrusive rolling of annular parts having a complex axial cross section. The term "complex" is adopted herein to designate axial cross sections departing from a simple cylindrical or conical or conoidal form such as can be formed in an integral or non-openable die and withdrawn therefrom without necessity for opening the die. For example, the invention is particularly adaptable to the forming of a collar having multiple (e.g., conical or conoidal) surfaces flaring in opposite directions from a medial plane normal to the axis of the collar. As a more specific example, there is a demand for collars or rings or sleeves with a venturi type throat composed of conical or conoidal surfaces flaring in opposite directions along the axis of the collar from a medial plane. As another example, the invention is applicable to the forming of a nozzle having, in addition to the tapered nozzle throat, a reentrant or reversely flaring surface either at the small end (e.g., discharge throat) or at the large end (e.g., coupling neck) of the nozzle. Other applications of the invention are in the forming of cylindrical collars or sleeves with reentrant flanges at their ends or with internal convolutions or grooves or ribs for various purposes such as for anchoring the collar or sleeve or ring to an adjoining structure by a flange or other mounting part. Another important application of the invention is in the forming of aircraft wheel rims. The invention is especially useful in connection with the forming of such annular parts where they are of large diameter and must conform to rigid specifications for dimensions, finish, tensile and compressive strength etc., where conventional spinning methods are inadequate.

A major object of the invention is to provide a method and apparatus for fabricating any of such parts wherein a work part in the form of a simple ring (e.g., short cylinder) is formed entirely by extrusive rolling to the completely finished condition without the necessity for employing additional techniques such as form-cutting or milling, or for utilizing more complex techniques.

Toward the attainment of the foregoing general objects the invention provides an extrusive rolling process and apparatus wherein:

(1) A simple annular work piece is inserted into a female die composed of segments; the die is rotated to transmit rotation to the work piece and simultaneously a work roller is inserted into the space within the work piece and pressed outwardly against the inner wall thereof; and the roller is then simultaneously moved axially and radially against the inner wall of the work piece in a path such as to develop a complex configuration;

(2) Wherein the complex configuration can be developed simply by forming the work piece outwardly against the internal die surface of a die ring or sleeve and impressing the die surface into the external surface of the work piece;

(3) Or wherein the required configuration can be developed by the guided movement of the work roller or rollers against the internal surface of the work piece so as to develop a required configuration in said internal surface;

(4) Wherein the work piece can be first supported in an initial position outside the forming area of the machine and then drawn into said forming area by controlled mechanism and centered in a selected position within said forming area;

(5) Wherein the die ring can be opened up and moved to a position substantially outside the forming area and returned in both axial and radial directions into the forming area and inserted into a holding ring or rings adapted to close the die segments tightly together and to hold them under high reactive resistance to spreading of the die ring and to the high extrusive pressures applied inside the ring during the forming operation;

(6) Wherein a simple (e.g., cylindrical) work piece can be simultaneously worked at both ends thereof with both ends being formed radially outwardly from a starting diameter in an intermediate plane, so as to balance the axial drag of a work roller against one end of the work piece against the axial drag of another work roller against the other end of the work piece and thereby avoid any tendency for the work to creep axially under such axial drag;

(7) Wherein the forming of an annular part with oppositely flared end portions that are symmetrical to one another can be speeded and made more accurate and satisfactory by the aforesaid balancing of the operation of two work rollers operating simultaneously from an intermediate plane toward the respective ends of the work piece and at substantially equal rates of axial travel.

Other objects and advantages will become apparent in the ensuing specification and appended drawing in which:

FIG. 1 is a schematic diagram of the essential parts of my apparatus, illustrating the operation of the method and apparatus;

FIG. 2 is an end view of the apparatus, parts being broken away and shown in cross-section;

FIG. 3 is a side elevational view of the essential structure of the apparatus omitting the control mechanism and with portions shown in axial section, as indicated by line 3—3 of FIG. 2;

FIG. 4 is a detail sectional view of a portion of the die ring and illustrating the cross sectional configuration of a finished part therein;

FIG. 5 is a fragmentary sectional view illustrating the beginning of a rolling operation of the method; and FIG. 6 is a detail sectional view of the die holding-opening-closing linkage.

Referring now to the drawings in detail, I have shown therein, as an example of one means by which the invention may be practiced, an apparatus especially suitable for forming annular collars of complex cross section and of large dimensions such as a jet engine mounting ring shown in cross section at A in FIG. 4, said apparatus (being of large dimensions) being mounted in a concrete pit B; and said apparatus comprising, in general, a carriage mechanism C for producing movements in X and Y directions, a sectional die ring D for shaping the external configuration of the work part A, work-extruding rollers E carried and positioned by the carriage mechanism C, die-holding, opening and closing mechanism F, hydraulic mechanism for power movement of the carriage apparatus C and the work rollers E, said hydraulic mechanism being indicated generally at G in FIG. 1, and cam-follower control apparatus which is indicated schematically at H in FIG. 1. The apparatus also includes mechanism I for initially supporting and positioning the work blank within the forming space (within tht die). The apparatus further includes power mechanism shown schematically (at M for motor) for rotating the die D.

Referring now to FIG. 4, the work part A to be formed by the use of my method is illustrated as being a jet motor mounting ring including a main body collar 10 having respective frusto-conical end portions flaring outwardly substantially symmetrically from a medial plane indicated by the broken line 11. Each end portion of collar 10 has a radially outwardly projecting end flange 12 and a radially inwardly projecting internal rib 13. A medial rib 14 is formed at the junction between the two end portions of the collar and lies in the medial plane 11. The cross-sectional configuration shown herein is only one of many complex configurations which can be advantageously formed by my method. Both external and internal surfaces of part A are complex within the meaning of the term as used herein, since neither surface could be stripped from a die mating therewith, except by moving segments of the die radially away from the formed part.

THE METHOD

My improved method of forming the part A includes, in general, the following steps:

(1) A work blank A-1 of simple form, such as a short cylinder, is hung upon the supporting-positioning mechanism I after the latter has been projected to a position indicated in dotted lines in FIG. 3. The mechanism I is then actuated to draw the work piece A-1 into the center of the forming space.

(2) The die D, having been retracted to an open position shown in broken lines at D-1, is returned to its normal working position, centered around the work piece A-1 as shown in full lines, and is locked within the holding mechanism F preparatory to functioning as a die-ring.

(3) The die D is then rotated (under power transmitted from driving mechanism M) and simultaneously the work rollers E are moved radially outwardly against the work piece A (e.g., in a horizontal direction moving toward the observer viewing FIG. 2 in the particular arrangement shown). Where the part is of the double flaring shape shown in FIG. 4, with minimum diameter at its medial plane 11, the rollers E are spread apart sufficiently to straddle the medial plane and to engage the work A-1 at equal distances on opposite sides of the apex 15 of the die, and the first step of the forming operation is to lock the work piece A-1 to the die as shown in FIG. 5 by forming annular indentations within the work piece, corresponding outwardly projecting beads 16 being formed against opposite sides of apex 15.

(4) The work rollers E are then moved apart and simultaneously moved radially outwardly along a diagonal path generally paralleling the conical inner die faces 17 of the die-ring, as indicated by the arrows 18 in FIG. 5. Where the forming operation is a difficult one, as where the part is of large dimensions, it may be preferable to form the part in a series of passes, in which instance the first pass is one in which the work rollers E are moved to the respective end extremities of the work piece A-1, thus forming a double cone without substantial reduction in thickness of the work piece. In successive passes, the work rollers E are returned to positions near the medial plane 11 and are again moved apart and radially outwardly under cam-following control so as to follow a path in which they first shape the respective sides of the medial rib 14, then move along the paths 18 toward the outer ribs 13, then move apart in paths inclined inwardly toward the major axis (of work piece A-1) so as to form the inner sides of ribs 13, and then are moved radially outwardly with relatively small proportion of axial spreading movements, to form the outer sides of ribs 13, then resume the path 18 to positions near the respective ends of the work piece A-1, and then move substantially radially outwardly (with little or no axial travel) displacing outwardly the metal which has been extruded past the ends of the die, thereby commencing the formation of end flanges 12. This second pass may in some instances complete the formation of the part A and in other instances it may be desirable to make a third pass in which the final finished configuration is attained. Also it may be noted that in some instances (e.g., by first heating the part and forming it while hot) the entire forming operation may consist of a single pass, with the ribs 14 and 13 retaining the original thickness of the work blank.

Preferably, in positioning the part within the die preliminary to the forming operations, the die-ring is closed tightly around the periphery of the part so as to compressibly engage the medial area of the part before the rolling operation is commenced.

(5) After the part A is completely formed, the die is opened by moving the segments to their positions at D-1 and the part is left hanging upon the positioning mechanism I. This mechanism is then moved to the projected position I-1 and the part can then be easily removed from the machine.

THE APPARATUS

In detail, the apparatus comprises the following structure:

Pit B may be simply a concrete lined pit receiving that portion of the die-ring holding mechanism F which extends below the frame structure of carriage mechanism C, and does not constitute an essential part of the invention since it is used only where the apparatus is of large dimensions for operation on large parts.

A base 20 frames the top of the pit B, its sides and ends resting upon a supporting floor 21 surrounding the pit. The base 20 may be simply an open frame of rectangular box-shape with any suitable stiffening or bracing structure therein. The forward side of the frame as seen in FIG. 3 is broken away. Carriage mechanism C comprises respective slide units movable on respective horizontal X and Y axes (as indicated in FIGS. 2 and 3) at right angles to one another. The X-axis (FIG. 2) is normally eccentric with relation to the major axis of rotation, about which the die and holding ring structure are concentric (FIG. 2). Mounted upon respective ends of the base 20 are respective pairs of X-axis ways 22 on which are slideable X-axis carriages 23 having respective Y-axis ways 24 on which are mounted respective Y-axis carriages 25. The X-axis extends horizontally and may be regarded as the common axis of the work rollers E, along which they can be moved toward and away from one another. There are two parallel Y-axes, one for each work roller E, extending normal to the X-axis on opposite sides of and parallel to the medial plane 11 and movable toward and away and away from one another in accordance with the movements of Y-carriages 25. The work rollers E are mounted to opposed inner ends of carriages 25 so as to be subject to movements of carriages 25 and also of carriages 22.

Die D comprises a plurality of segments 30 (e.g., three 120 degree segments as indicated in FIG. 2) having respective radial ends 31 adapted to come together in full abutting engagement to form a complete circular die-ring. The segments have respective portions of the frusto-conical internal die faces 17 formed therein and have respective segments of a periphery which can be cylindrical in the intermediate area thereof but has at its ends wedging faces 32 which are frusto-conical, of low taper. The wedging faces 32 co-operate with corresponding throats of a pair of holding rings of mechanism F for holding the segments 30 tightly in die-closed position with ends 31 tightly abutting one another. Each of the segments 30 also has a pair of circumferentially spaced ears 33 connecting it to the holding-closing-opening apparatus F. Work rollers E comprise hardened roller rims 35 which are preferably demountably attached to spindle heads 36 of roller spindles 37 suitably mounted as by anti-friction bearings 38 and 39 in the respective Y-axis carriages 25.

Holding, opening, and closing apparatus F comprises a pair of axially-opposed holding rings 40 and 41 of adequate radial width to provide a high degree of hoop strength for containing and holding respective ends of the die-ring D, the respective holding rings 40, 41 having frusto-conical wedging throats 42 adapted to mate with frusto-conical wedging faces 32 of die-ring D. Holding ring 40 has a generally cylindrical rim portion 43 which is mounted within a plurality of circumferentially-spaced flanged guide rollers 44 rotatably mounted upon respective spindles 45 formed as necked-down extensions of cylindrical guide studs 46. Spindles 45 extend through and tie together respective frame rings 47 and 48 which are further connected by a series of circumferential spacer blocks or bars 49 to provide a rigid frame structure of cage form which is fixedly mounted to the base 20 by suitable backets such as those indicated at 50, bridging between the outer faces of rings 47, 48 and the inner faces of the respective ends of frame 20.

The end flanges of guide rollers 44 are in embracing relation to opposite end faces of the rim 43 of holding ring 40, so as to hold the ring 40 in an axially fixed position while permitting it to freely rotate within the rollers 40, the latter functioning as anti-friction supports riding against the rim 43 and positioning the ring 40 accurately in concentric relation to the X-axis (passing through the center of die-ring D).

Mounted for axially-slidable movement on guide studs 46 is an actuator ring 55 having respective circumferentially spaced axial bearing bores through which the studs 46 extend. Actuator ring 55 is provided with a series of circumferentially-spaced, radially inwardly projecting studs 56 on which are rotatably mounted respective actuator rollers 57. Rollers 57 project into an external annular groove 58 in an actuator collar 59 which is formed integrally with the holding ring 41, projecting axially outwardly from the periphery thereof. Projecting inwardly from said periphery are a plurality of pairs of circumferentially-spaced ears 60 which are in radially opposed relation to the ears 33 on the periphery of die-ring D. Pairs of actuator links 61 extend radially (when the die-ring is closed) between the ears 33 and 60 and are pivoted thereto on pivot pins 62 and 63 respectively.

A plurality of actuator cylinders 64 are mounted upon the outer face of fixed frame ring 47 and are provided with respective pistons having piston rods 65 extending axially through the frame ring 47, across the space between the two frame rings, clearing the rim 43 of holding ring 40, thence through the frame ring 48 and anchored at their ends in an actuator collar 59. Through suitable hydraulic lines 66 and a two-way control valve (not shown) the cylinders 64 are connected to the hydraulic power (pumping) mechanism of the apparatus (not shown) for two-way actuation. By projecting the piston rods 64, the holding ring 41 is projected to the position shown in broken lines in FIG. 3, drawing the outer ends of actuator links 61 axially with the ring 41.

Disposed midway between each pair of actuator links 61 is a control link 74 which is pivoted between pairs of ears 75 and 76 on the periphery of the respective die segment 30 and a radially opposed peripheral portion of holding ring 41, on respective pivots 67 and 68 the axes of which are displaced radially outwardly from the extended axes of pivots 62 and 63 respectively. Each control link 74 forms a parallelogram structure with its respective pair of guide links 61, such as to control the swinging movement of links 61 in a manner to prevent canting of the respective die-segment 30 (from a plane parallel to medial plane 11) as it is moved to its open position.

Associated with each control link 74 is a torsion spring 70 which is coiled about the outer pivot 68 thereof and has its respective tangential end portions engaged against the link 74 and one of the ears 76 respectively so as to exert spreading action between these parts as indicated by the arrow 69 in FIG. 6. Torsion springs 70 function to swing the links 74 outwardly so as to draw the respective die-ring 30 radially outwardly as indicated by arrow 69 of FIG. 6, as the holding ring 41 is shifted axially.

Positioning mechanism I comprises a plurality of support rollers 80 mounted on respective spindles 81 which are fixed in and project from a mounting block 82 carried by a slide 83 mounted in ways 84 which in turn are mounted to the circular frame ring 47. Mounting block 82 is adapted to be shifted axially by a suitable actuator cylinder 85 one end of which can be secured to the mounting block 82 as indicated, a piston rod 86 projecting from its other end and being connected as by an arm 87 to the slide 83. Suitable two-way actuation of cylinder 85 is provided by a suitable control valve (not shown) connected to the hydraulic system. By actuating the cylinder 85 in a projecting direction, it will project the rollers 80 to their projected positions I–1, where the work blank A–1 can be conveniently hung over the rollers 80. I employ three of the rollers 80 in an arcuate array (FIG. 2) such as to position the suspended work blank A–1 in substantially centered relation to the die-ring axis. This centered position will be maintained as the cylinder 85 is actuated in the reverse direction to draw the work blank A–1 into the die forming space, and centering of the work blank A–1 with respect to the medial plane 11 is accomplished by stopping the cylinder 85 at the proper point in its retracting movement.

Control apparatus H (FIG. 1) comprises a pair of hydraulic actuators including respective cylinders 90 mounted to the respective ways 22 (FIG. 2) on a common axis parallel to the X-axis and having respective piston rods 91 attached to suitable anchors 92 on the respective carriages 23, whereby actuation of cylinders 90 will slide the carriages 23 on their ways 22. The cylinders 90 are provided with two-way hydraulic actuation through suitable connecting lines 93 leading to a common speed-regulated control device. Such common control apparatus is arranged to move the piston rods 91 simultaneously in opposite directions, either when separating the carriages 25 or when bringing them back toward one another.

Attached to the respective piston rods 91 by connections indicated schematically at 94 in FIG. 1 are linear cams or templates 95 which are engaged by followers 96 of respective servo-follower control valves 97 which control the movements of carriages 25 on their individual Y-axis, for moving the work rollers E radially against the interior of work piece A–1. This is executed through Y actuators (FIG. 2) comprising cylinders 100 secured to respective carriages 25 and having pistons provided with piston rods 101 anchored to suitable anchor arms 102 on one side of respective X carriages 23.

In the operation of the control apparatus G, the speed of operation is controlled by controlling the movement of piston rods 91 which transmit X-axis movement to the X-carriages 23. Since the cams 95 are mechanically fixed to the piston 91, they will move on an axis parallel to the axis of X actuators 90, 91, moving toward one another or apart in synchronism with the movements of X-carriages 23. The several follower valves 97 are suitably secured to the fixed frame of the apparatus so that their follower rollers 96 will be actuated by rising portions 98 of the respective cams at the positions where Y-movement is to be transmitted to the rollers E, which positions will be co-ordinated with the movements (e.g., apart) along the X-axis so as to produce the desired internal configuration (e.g., including ribs 13 and 14 of part A) in the work piece A–1 so as to develop the finished part A. It will be readily apparent that the configuration of cam 95 can be developed in this way so as to produce any desired internal complex configuration in the part A. The control operation of the servo-follower valve 97 is executed by suitable hydraulic connections to the respective Y-actuators 100, 101 through suitable hydraulic circuitry including two-way actuation lines 103 so as to produce the proper degree of movement of cylinders 100 corresponding to the configuration of cams 95. Since the hydraulic circuitry and valve mechanism of a system for programmed control of machine operations is well known to those in the art of program control of machine tools, details of such circuitry are not disclosed herein.

Motor M is mounted on base 20 as shown in FIG. 2. Its shaft extends through frame plate 47 and drives a spur pinion 110 which in turn drives a ring gear 111 secured to holding ring 40. Motor M and pinion 110 are illustrated schematically in FIG. 1, shifted circumferentially to a position convenient for illustration. Their true positions are shown in FIG. 2.

Motor M is operated to transmit rotation to holding ring 40 which, being wedged against the periphery of die D, rotates the die around the major axis. The die D, being closed tightly around the work piece A–1, grips the same and transmits rotation thereto. Work rollers E, which normally occupy an eccentric position on one side of the major axis, can be moved radially against work piece A–1 by operation of the respective Y-actuators. Thus they are projected against the work piece A–1 to start the rolling operation as illustrated in FIG. 5, and are gradually moved to a greater radial distance from the major axis as the X-actuators 90, 91 are operated to draw the work rollers apart, the resultant movements being in diagonal directions as indicated by arrows 18 in FIG. 5.

It will be understood that changes may be made in the details of construction of this apparatus and equivalent parts and components may be substituted for those specifically disclosed, within the spirit of the invention and also changes are intended to be covered by the claims hereto appended.

I claim:

1. A method of internal rolling of an annular part, comprising the following steps: inserting an annular work piece into a female die having an internal die wall with oppositely flared areas at respective ends thereof conforming to an external configuration required in said part; rotating the die and transmitting the rotation thereof to the work piece; inserting a pair of work rollers into the space within the work piece; pressing said rollers radially outwardly against the work piece and simultaneously moving them axially away from one another and radially outwardly so as to shape respective ends of said ring against the oppositely flaring areas of said die wall, with the axial drag of each roller on the work piece being balanced against that of the other.

2. The method defined in claim 1, wherein said die comprises several segments, and including the further step of opening the die by moving the die segments radially away from the part after it has been shaped, and then removing the part from the opened die.

3. The method defined in claim 2, including the preliminary forming step of simultaneously rolling internal annular grooves in the work piece on opposite sides of an internal annular apex between respective sides of the die, whereby to form axially opposed peripheral beads in the work piece engaging the internal die faces on opposite sides of said apex and thereby locking the work piece to the die against axial shifting movement.

4. The method defined in claim 3, including the preliminary step of supporting the work piece for rolling movement about the die axis during said preliminary forming step and then permitting the work piece to be released from said rolling support as it is further formed within the die.

5. Apparatus for extrusive rolling of annular parts of complex cross-section, comprising: a die ring composed of segments having respective portions of an internal die surface; a pair of holding rings having respective internal faces dimensioned for encircling engagement with respective ends of said die for holding it closed with a hoop action; a forming roller operable within said die to roll an annular work blank against said internal die surface; means for separating said holding rings axially to release said die therefrom; and means for opening said die by shifting said segments radially outwardly when thus released from said holding rings.

6. Apparatus as defined in claim 5, including an annular series of guide rollers in rolling engagement with the periphery of one of said holding rings; and means supporting said guide rollers so as to support said one holding ring and said die for rotation with reference to said forming roller.

7. Apparatus as defined in claim 6, including means projecting axially from said one holding ring and supporting the other holding ring for axially shifting movement for effecting the said separating of said holding rings, said separating means comprising a plurality of circumferentially spaced actuators operating between the respective holding rings.

8. Apparatus as defined in claim 5, including positioning means for rotatably supporting an annular work piece and for positioning it within said die preparatory to engagement of the work piece by said forming roller.

9. Apparatus as defined in claim 5, including positioning means for rotatably supporting an annular work piece and for positioning it within said die preparatory to engagement of the work piece by said forming roller, said positioning means comprising an arcuate array of flanged support rollers over which said work piece can be hung, said forming roller being positioned for engagement with said work piece in an area below said support rollers.

10. Apparatus for extrusive rolling of an annular part having respective end portions flaring away from a medial plane normal to its axis, comprising: a female die comprising a plurality of segments; means for supporting and moving said segments radially for opening and closing the die; means for rotating said die for transmitting rotation to an annular work piece positioned therein; a pair of forming rollers; carriage means supporting said forming rollers for rotation parallel to the die axis on a common X-axis for separating and approaching movements along said X-axis, and for radial movements on respective Y-axis for developing the flaring configuration of the respective end portions of said annular part; and means for effecting coordinated movements of said carriage means such as to move said rollers apart along said X-axis away from said medial plane on respective sides thereof while simultaneously moving said rollers radially outwardly from the die axis against the work piece in paths by which said flaring configuration is developed.

References Cited

UNITED STATES PATENTS

| 32,850 | 7/1861 | Pruden | 72—83 |
| 1,212,489 | 1/1917 | Jackson | 72—78 |
| 3,141,433 | 7/1964 | Busch | 72—81 |
| 3,160,036 | 12/1964 | Ernestus | 72—110 |

FOREIGN PATENTS

| 159,576 | 4/1905 | Germany. |
| 537,094 | 11/1931 | Germany. |

RICHARD J. HERBST, *Primary Examiner.*